United States Patent
Braksator

(10) Patent No.: US 10,394,677 B2
(45) Date of Patent: Aug. 27, 2019

(54) METHOD TO EFFICIENTLY AND RELIABLY PROCESS ORDERED USER ACCOUNT EVENTS IN A CLUSTER

(71) Applicant: International Business Machines Corporation, Armonk, NY (US)

(72) Inventor: Mark Braksator, Corona, CA (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 15/338,237

(22) Filed: Oct. 28, 2016

(65) Prior Publication Data
US 2018/0121515 A1    May 3, 2018

(51) Int. Cl.
G06F 16/00    (2019.01)
G06F 11/30    (2006.01)
G06F 16/18    (2019.01)

(52) U.S. Cl.
CPC .......... G06F 11/30 (2013.01); G06F 16/1858 (2019.01)

(58) Field of Classification Search
CPC .............. G06F 17/30483; G06F 16/1858
USPC ........................................ 707/738
See application file for complete search history.

(56) References Cited

U.S. PATENT DOCUMENTS

| | | | |
|---|---|---|---|
| 5,339,427 A | 8/1994 | Elko et al. | |
| 5,666,486 A | 9/1997 | Alfieri et al. | |
| 5,828,876 A * | 10/1998 | Fish | G06F 16/1858 |
| 6,963,882 B1 | 11/2005 | Elko et al. | |
| 7,181,489 B2 * | 2/2007 | Lection | G06Q 10/10 709/202 |
| 7,721,152 B1 | 5/2010 | Joshi et al. | |
| 8,694,625 B2 | 4/2014 | Jennings et al. | |
| 8,756,314 B2 | 6/2014 | Hall et al. | |
| 8,868,748 B2 * | 10/2014 | Attaluri | G06F 9/526 709/226 |
| 9,424,288 B2 | 8/2016 | Suleiman et al. | |
| 2010/0146122 A1 | 6/2010 | Prince, Jr. et al. | |

OTHER PUBLICATIONS

"A method and system to categorize lock events and locking metrics of a database automatically according to application specific data", IP.com, Prior Art Database Technical Disclosure No. IPCOM000198805D, Aug. 17, 2010, 5 pages.
"A method to Automatically Assign Event Identifiers to all Managed Systems", IP.om, Prior Art Database Technical Disclosure No. IPCOM000212732D, Nov. 26, 2011, 3 pages.
"Unique Identifiers in Automated Processing of Unstructured Text", IP.com, Prior Art Database Technical Disclosure No. IPCOM000236223D, Apr. 12, 2014, 7 pages.

* cited by examiner

*Primary Examiner* — Chelcie L Daye
(74) *Attorney, Agent, or Firm* — Yee & Associates, P.C.; Jeffrey LaBaw

(57) ABSTRACT

A method, apparatus, and computer program product uses a SELECT FOR UPDATE, to pick up events from a TARGET_EVENT table. Selected events are reserved for processing by a cluster node which triggers a query. PICKUP_TIME and SERVER_ID values are inserted for each of the events picked from the TARGET_EVENT table. The events are grouped by TARGET and UID while preserving a relative order in an overall event sequence. A group of events is then submitted for processing.

20 Claims, 10 Drawing Sheets

METHOD TO EFFICIENTLY AND RELIABLY PROCESS ORDERED USER ACCOUNT EVENTS IN A CLUSTER

BACKGROUND

1. Field

A method, apparatus, and computer-program product that relates generally to sequential processing of account events on multiple user identifications (IDs) and remote targets at the same time. More specifically, account events are processed using a cluster aware target-UID (target user identification) locking mechanism.

2. Description of the Related Art

In provisioning solutions, such as IBM Security Identity Governance and Intelligence (IGI), a large number of user accounts may be provisioned to remote targets. Subsequently, the same accounts may be automatically updated and/or deleted depending on the state of access policies within the system. The number of such account operations may be higher when they are triggered from an identity management system through dynamically evaluated access policies. Therefore, executing entire groups of account events in parallel, on different remote targets, offers optimal turn-around times for end users and the best overall scalability of the system.

There are many target types on which groups of account events may be executed in parallel. Each target type may have a different way of storing user authentication and authorization information. For example, remote targets may store account information in specific files on the file system. During updates, input/output (I/O) access to the specific files may be serialized to avoid data inconsistency. Other target types may store their user account information in databases to allow safe concurrent updates.

To guarantee a correct order of event processing, systems such as IGI, address the asynchronous account store access limitations imposed by many different target types. In order to address the many asynchronous account store access limitations uniformly and efficiently across all target types, it may be advantageous to keep track of unique target-UID UID (target user identification) combinations that are currently selected for account updates. However, target access complexity increases when multiple nodes in an application cluster are deployed to process target events. Therefore, a process to keep track of unique target-UID (target user identification) combinations must also scale well in the application cluster.

Synchronized target access may be achieved by allowing only one node in the cluster to process all account events, one at the time, in sequence. However, allowing only one node at the time to process all account events in a cluster is not efficient. Another synchronized target access may be achieved by synchronizing account event processing at the target level, and processing all account events on that target in sequence. Many targets, such as those using databases for user repositories, allow for safe concurrent operations on more than one account at the same time. The entire target may be locked to process an update on any given account. However, this process is also inefficient.

A need exists for an improved method, apparatus, and computer program product to sequentially process account events on multiple user IDs and remote targets at the same time.

SUMMARY

According to one illustrative embodiment, a computer-implemented method uses a SELECT FOR UPDATE, to pick up events from a TARGET_EVENT table. Selected events are reserved for processing by a cluster node which triggers a query. PICKUP_TIME and SERVER_ID values are inserted for each of the events picked from the TARGET_EVENT table. The events are grouped by TARGET and UID while preserving a relative order in an overall event sequence. A group of events is then submitted for processing.

DETAILED DESCRIPTION

Figure 1:
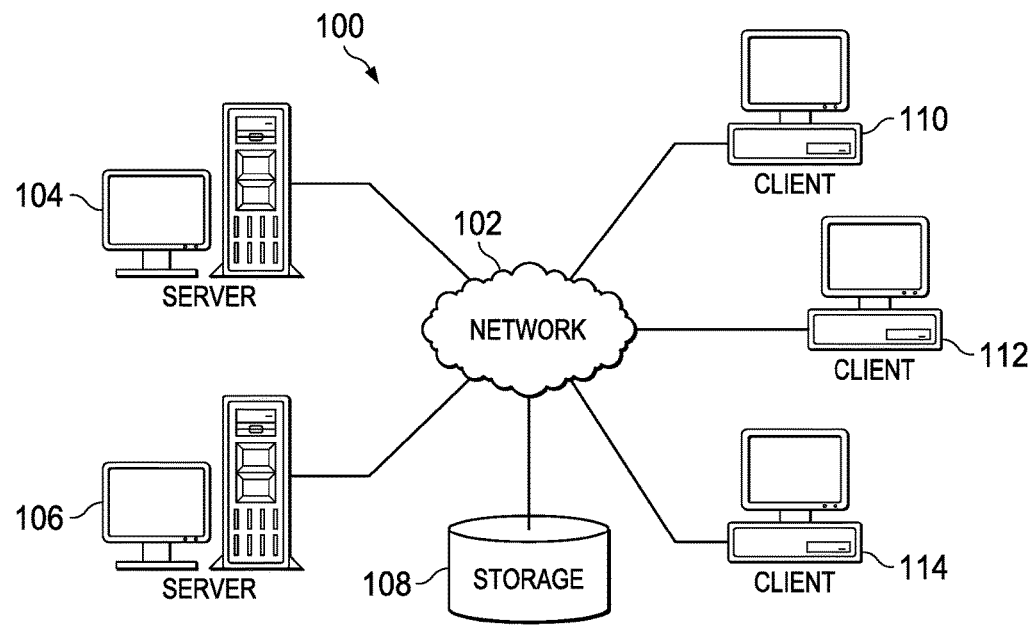
FIG. 1 is a pictorial representation of a network of data processing systems in which an illustrative embodiment may be implemented.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the devices. A non-exhaustive list of more specific examples of computer-readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, or any other suitable combination of the foregoing devices. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium, or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example, through the Internet using an Internet service provider. In some embodiments, electronic circuitry including, for example, programmable logic circuitry, field-programmable gate arrays (FPGA), or programmable logic arrays (PLA), may execute the computer-readable program instructions by utilizing state information of the computer-readable program instructions to personalize the electronic circuitry, in order to perform aspects of the present invention.

Aspects of the present invention are described below with reference to the flowchart illustrations and/or block diagrams of methods, apparatus (systems), and computer program products according to the embodiments of the present invention. It will be understood that each block of the flowchart illustrations and/or block diagrams, or combinations of blocks in the flowchart illustrations and/or block diagrams, can be implemented by computer-readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. These computer program instructions may also be stored in a computer-readable medium that can direct a computer, other programmable data processing apparatus, or other devices, to function in a particular manner, such that the instructions stored in the computer-readable medium produce an article of manufacture including instructions which implement the function or act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device, to produce a computer implemented process, such that the instructions which execute on the computer, other programmable apparatus, or other device implement the functions or acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, or combinations of blocks in the block diagrams and/or flowchart illustration, can be implemented by special purpose hardware-based systems that perform the specified functions or acts, or carry out combinations of special purpose hardware and computer instructions.

Figure 2:
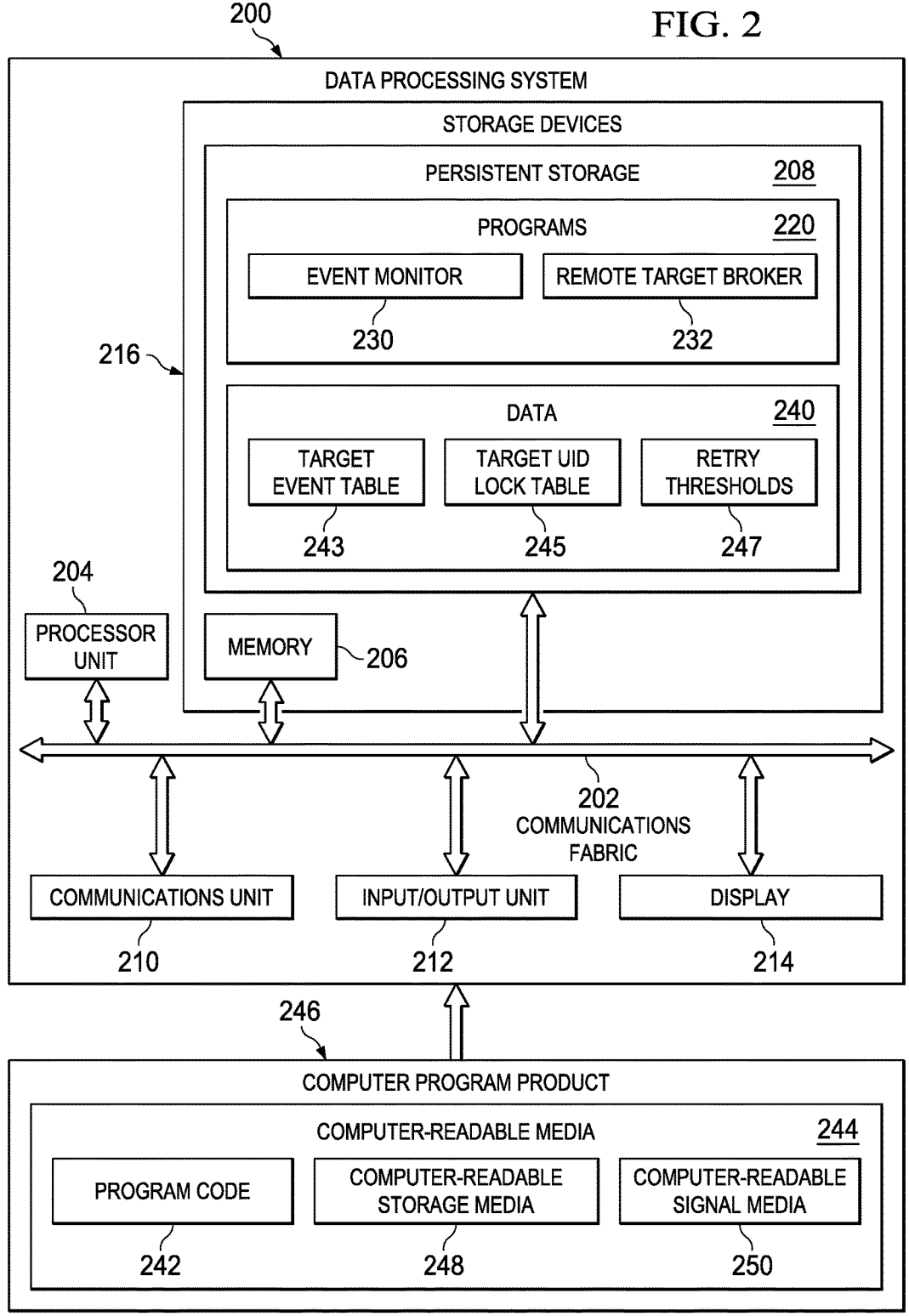
FIG. 2 is a diagram of a data processing system in which an illustrative embodiment may be implemented.
Figure 3:
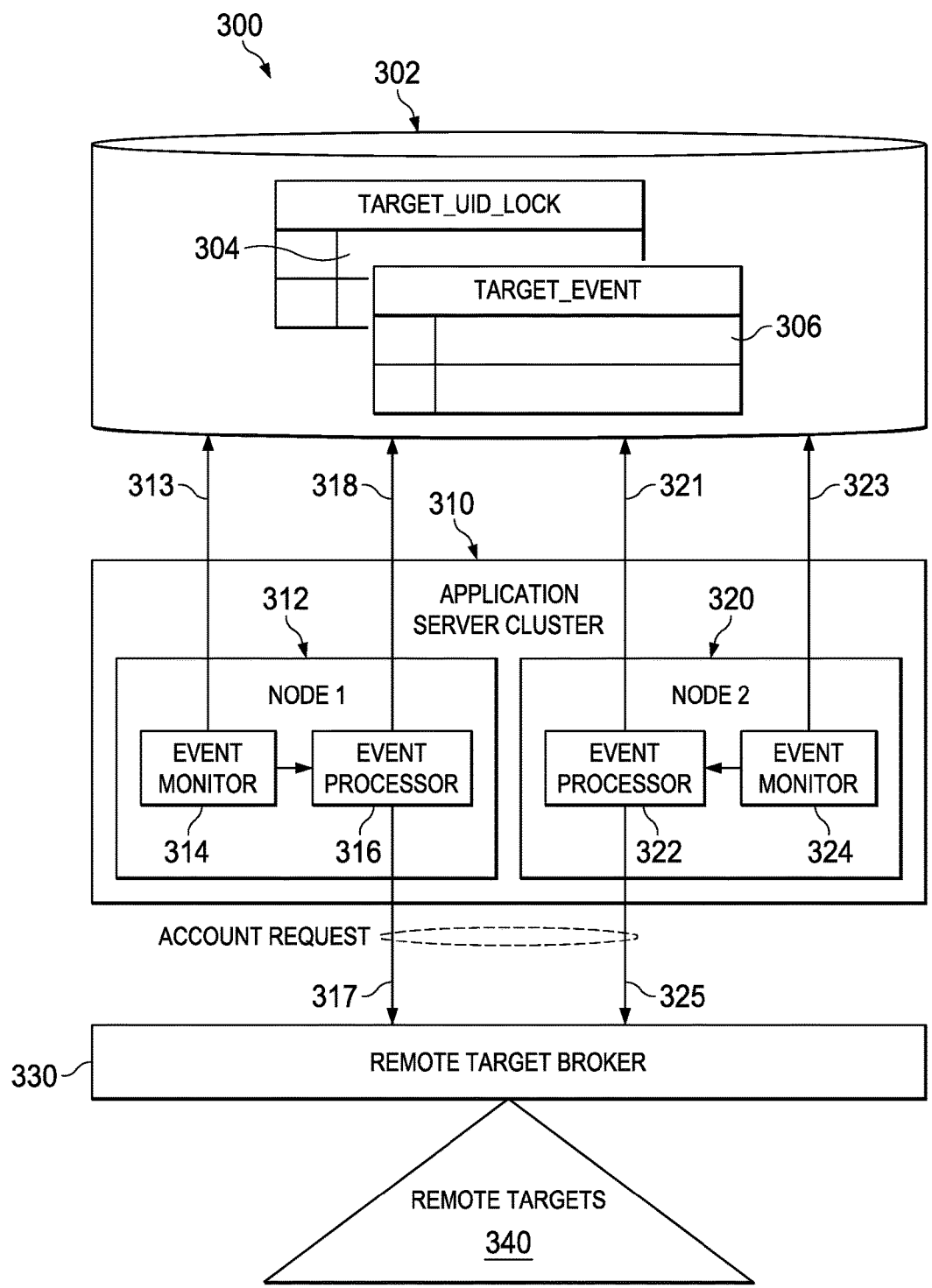
FIG. 3 is a schematic diagram illustrating a configuration to process events at remote targets in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples, and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wired communication links, wireless communication links, or fiber optic cables.

In the depicted example, server 104 and server 106 connect to network 102, along with storage 108. Server 104 and server 106 may be, for example, server computers with high-speed connections to network 102. In addition, server 104 or server 106 may, for example, manage recovery of a customer workload after failure of a primary computing environment executing the customer workload. The failed primary computing environment may be, for example, a server or a set of servers in a data center environment or a cloud environment. Server 104 or server 106 also may generate a secondary virtual machine seed image storage at a secondary data processing site for the failure recovery. The configuration of the secondary data processing site is similar to the configuration of the primary data processing site.

Client 110, client 112, and client 114 also connect to network 102. Clients 110, 112, and 114 are clients of server 104 and/or server 106. Server 104 and server 106 may provide information, such as boot files, operating system images, virtual machine images, or software applications to clients 110, 112, and 114.

In this example, clients 110, 112, and 114 may each represent a different computing environment. A computing environment includes physical and software resources used to execute a set of one or more customer workloads or tasks. A computing environment may comprise, for example, one server, a rack of servers, a cluster of servers, such as a data center, a cloud of computers, such as a private cloud, a public cloud, or a hybrid cloud, or any combination thereof. In addition, each of clients 110, 112, and 114 may be a primary data processing site or a secondary data processing site. A primary data processing site initially executes a customer workload using a set of primary virtual machines and images. A secondary data processing site executes the customer workload using a set of secondary virtual machines and seed images when one or more primary virtual machines fail while processing the customer workload at the primary data processing site.

Storage 108 is a network storage device capable of storing any type of data in a structured format or an unstructured format. The type of data stored in storage 108 may be, for example, a list of computing environments with corresponding available resources, a list of primary data processing sites, a list of secondary data processing sites, a list of customer workloads, a plurality of virtual machine images, or other suitable types of data. Further, storage 108 may store other types of data, such as authentication data or credential data, that may include user names, passwords, and biometric data associated with system administrators, for example.

In addition, it should be noted that network data processing system 100 may include any number of additional servers, clients, storage devices, and other devices not shown. Program code located in network data processing system 100 may be stored on a computer-readable storage medium and downloaded to a computer or other data processing device for use. For example, program code may be stored on a computer-readable storage medium on server 104 and downloaded to client 110 over network 102 for use by client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer-readable program code or instructions for implementing processes of the illustrative embodiments may be located. In this illustrative example, data processing system 200 includes communications fabric 202, which provides communications between processor unit 204, memory 206, persistent storage 208, communications unit 210, input/output unit 212, and display 214.

Processor unit 204 serves to execute instructions for software applications and programs that may be loaded into memory 206. Processor unit 204 may be a set of one or more hardware processor devices, or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer-readable storage device is any piece of hardware that is capable of storing information, such as, for example, without limitation, data, computer-readable program code in functional form, and/or other suitable types of information either on a transient basis and/or a persistent basis. Further, a computer-readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some other combination of the above mentioned devices. The media used by persistent storage 208 may be removable. For example, a removable hard drive may be used for persistent storage 208.

In this example, persistent storage 208 stores programs 220 and data 240. Programs 220 may include event monitor 230 and remote target broker 232. Data 240 may include target event table 243, target UID lock table 245, and retry thresholds 247.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, a cable, a universal serial bus, or any other type of physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other type of wireless communication technology, or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable type of input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer-usable program code, or computer-readable program code that may be read and run by a processor in processor unit 204. The program instructions, in the different embodiments, may be embodied on different physical computer-readable storage devices, such as memory 206 or persistent storage 208.

Program code 242 is located in a functional form on computer-readable media 244 that is selectively removable, and may be loaded onto or transferred to data processing system 200 for running by processor unit 204. Program code 242 and computer-readable media 244 form computer program product 246. In one example, computer-readable media 244 may be computer-readable storage media 248 or computer-readable signal media 250. Computer-readable storage media 248 may include, for example, an optical or magnetic disc that is inserted or placed into a drive or other device that is part of persistent storage 208 for transfer onto a storage device, such as a hard drive, that is part of persistent storage 208. Computer-readable storage media 248 also may take the form of a persistent storage, such as a hard drive, a thumb drive, or a flash memory drive that is connected to data processing system 200. In some instances, computer-readable storage media 248 may not be removable from data processing system 200.

Alternatively, program code 242 may be transferred to data processing system 200 using computer-readable signal media 250. Computer-readable signal media 250 may be, for example, a propagated data signal containing program code 242. For example, computer-readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 242 may be downloaded over a network to persistent storage 208 from another device or data processing system through computer-readable signal media 250 for use within data processing system 200. For instance, program code stored in a computer readable storage media in a data processing system may be downloaded over a network from the data processing system to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components, excluding a human being. For example, a storage device may be comprised of an organic semiconductor.

As another example, a computer-readable storage device in data processing system 200 is any hardware apparatus that may store data. Memory 206, persistent storage 208, and computer-readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as a cache found in an interface and memory controller hub that may be present in communications fabric 202.

It is understood that although this disclosure includes a detailed description of cloud computing, implementation of the teachings recited herein are not limited to a cloud computing environment. Rather, the illustrative embodiments are capable of being implemented in conjunction with any other type of computing environment, now known or later developed. Cloud computing is a model of service delivery for enabling convenient, on-demand network access to a shared pool of configurable computing resources, such as, for example, networks, network bandwidth, servers, processing, memory, storage, applications, virtual machines, or services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, or measured service. On-demand self-service allows a cloud consumer to unilaterally provision computing capabilities, such as server time or network storage, as needed, automatically without requiring human interaction with the service's provider. Broad network access provides for capabilities that are available over a network and accessed through standard mechanisms that promote use by heterogeneous thin or thick client platforms, such as, for example, mobile phones, laptops, or personal digital assistants. Resource pooling allows the provider's computing resources to be pooled to serve multiple consumers using a multi-tenant model, with different physical and virtual resources, dynamically assigned and reassigned according to demand. There is a sense of location independence in that the consumer generally has no control or knowledge over the exact location of the provided resources, but may be able to specify a location at a higher level of abstraction, such as, for example, a country, a state, or a data center. Rapid elasticity provides for capabilities that can be rapidly and elastically provisioned, in some cases automatically, to quickly scale out and rapidly release to quickly scale in. To the consumer, the capabilities available for provisioning often appear to be unlimited and can be purchased in any quantity at any time. Measured service allows cloud systems to automatically control and optimize resource usage by leveraging a metering capability at some level of abstraction appropriate to the type of service, such as, for example, storage, processing, bandwidth, or active user accounts. Resource usage can be monitored, controlled, and reported providing transparency, for both the provider and consumer, of the utilized service.

Service models may include, for example, Software as a Service (SaaS), Platform as a Service (PaaS), and Infrastructure as a Service (IaaS). Software as a Service (SaaS) is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure, including a network, servers, operating systems, storage, or even individual application capabilities, with the possible exception of limited, user-specific application configuration settings. Platform as a Service (PaaS) is the capability provided to the consumer to deploy onto the cloud infrastructure, consumer-created or acquired, applications created using programming languages and tools supported by the provider. The consumer does not manage or control the underlying cloud infrastructure including networks, servers, operating systems, or storage, but has control over the deployed applications, and possibly application hosting environment configurations. Infrastructure as a Service (IaaS) is the capability provided to the consumer to provision processing, storage, networks, and other fundamental computing resources, where the consumer is able to deploy and run arbitrary software, which can include operating systems and applications. The consumer does not manage or control the underlying cloud infrastructure, but has control over the operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party, and may exist on-premises or off-premises. A community cloud is a cloud infrastructure shared by several organizations and supports a specific community that has shared concerns, such as, for example, a mission, security requirements, a policy, or compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, or public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

FIG. 3 depicts a schematic diagram illustrating a configuration for processing events at remote targets in accordance with an illustrative embodiment. Configuration 300 may comprise database 302, application server cluster 310, remote target broker 330 and remote targets 340. Database 302 stores TARGET_UID_LOCK table 304 and TARGET_EVENT table 306. TARGET_UID_LOCK table 304 may be target uid lock table 245 in FIG. 2 or TARGET_UID_LOCK table 410 in FIG. 4. TARGET_EVENT table 306 may be target event table 243 in FIG. 2 or TARGET_EVENT table 420 in FIG. 4. Application server cluster 310 may have a number of nodes. In FIG. 3, application cluster server 310 comprises node 1 312 and node 2 320. Node 1 312 may include event monitor 314 and event processor 316. Event monitor 314 may access database 302 via line 313 and event processor 316 may access database 302 via line 318. Node 2 320 may include event processor 322 and event monitor 324. Event monitor 324 may access database 302 via line 323 and event processor 322 may access database 302 via line 321.

In an illustrative embodiment, remote target broker 330 may be a component responsible for processing a number of account requests and performing an actual update on a remote target, such as may be included in remote targets 340. An account request may be transmitted to remote target broker 330 from node 1 312 by event processor 316 along line 317. Further account requests may be transmitted to remote target broker 330 from node 2 320 by event processor 322 along line 325.

An event monitor, such as event monitor 314 and event monitor 324, may be a single-threaded event monitor responsible for picking up a group of events from an event queue and distributing the group of events for processing by an event processor, such as event processor 316 and event processor 322.

Figure 4:
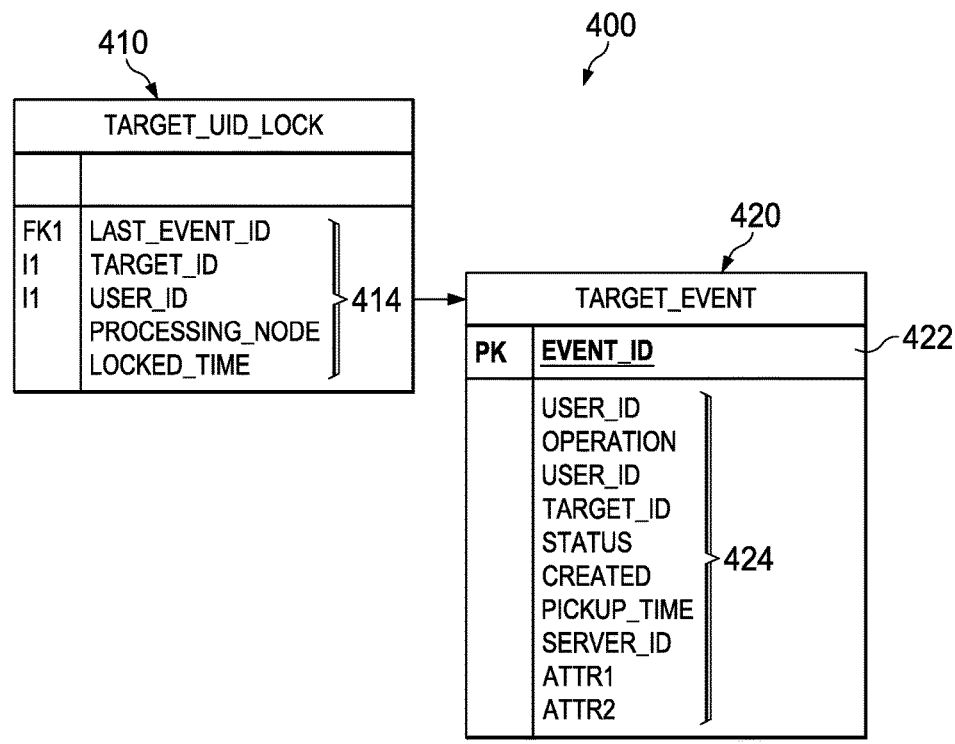
FIG. 4 is a schematic diagram illustrating a configuration for implementing an event queue in accordance with an illustrative embodiment.

FIG. 4 depicts a schematic diagram illustrating a configuration for implementing an event queue in accordance with an illustrative embodiment. Tables 400 comprise TARGET_UID_LOCK table 410 and TARGET_EVENT table 420. TARGET_UID_LOCK table 410 may include items 414 such as LAST_EVENT_ID, TARGET_ID, USER_ID, PROCESSING_NODE, and LOCKED_TIME. TARGET_UID_LOCK table 410 may be TARGET_UID_LOCK table 304 of FIG. 3.

In an illustrative embodiment, an event queue may be implemented using a relational table such as TARGET_EVENT table 420. In TARGET_EVENT table 420, all events are ordered by increasing EVENT_ID value. EVENT_ID column 422 of TARGET_EVENT table 420 may include items 424, such as USER_ID, OPERATION USER ID, TARGET_ID, STATUS, CREATED PICKUP_TIME, SERVER_ID, and a number of attributes such as ATTR1 and ATTR2. TARGET_EVENT table 420 may be TARGET_EVENT table 306 in FIG. 3. Two special columns (not shown) may be present in TARGET_EVENT table. First, PICKUP_TIME TIMESTAMP may contain times when an event was picked up by an event monitor, such event monitor 314 and event monitor 324 in FIG. 3. Second, SERVER_ID VARCHAR may contain an identifier of the node member which picked up the event.

Figure 5:
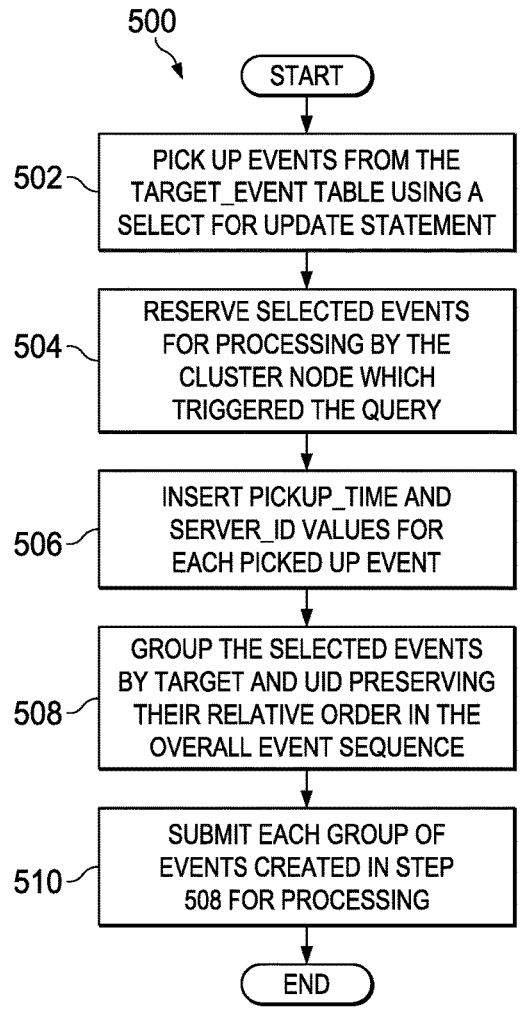
FIG. 5 is a flowchart illustrating a process for picking up events from a target event table in accordance with an illustrative embodiment.

FIG. 5 depicts a flowchart illustrating a process for picking up events from a TARGET_EVENT table in accordance with an illustrative embodiment. In the illustrative embodiment, processing sequence 500 picks up events from a TARGET_EVENT table using a SELECT FOR UPDATE statement (Step 502). The TARGET_EVENT table may be a table, such as TARGET_EVENT table 306 in FIG. 3 or TARGET_EVENT table 420 in FIG. 4. Selected events are reserved for processing by the cluster node which triggered the query (Step 504). PICKUP_TIME and SERVER_ID values are inserted for each picked up event (Step 506). The selected events are grouped by target and UID preserving their relative order in the overall event sequence (Step 508). Each group of events created in Step 508 is submitted for processing (Step 510).

Figure 6:
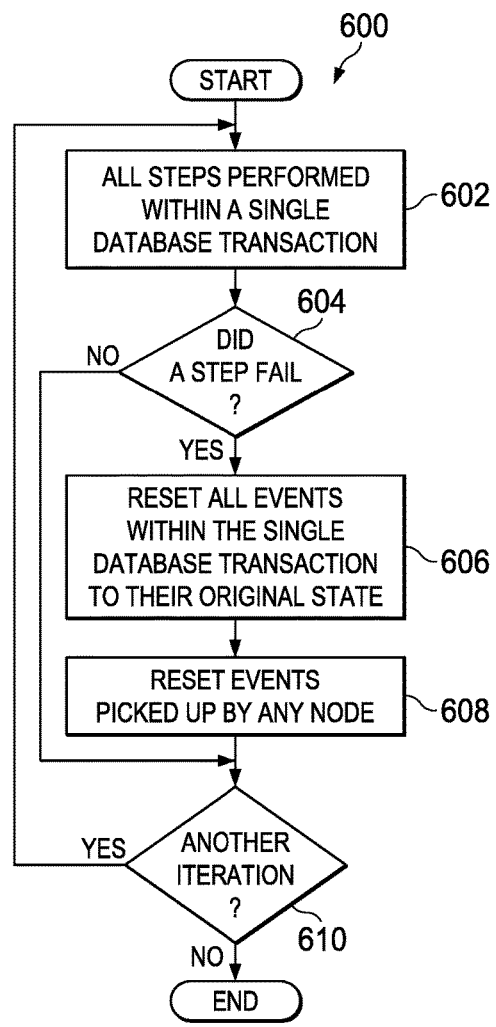
FIG. 6 is a flowchart illustrating a reset process for in accordance with an illustrative embodiment.

FIG. 6 depicts a flowchart illustrating a reset process in accordance with an illustrative embodiment. All steps in FIG. 5 are performed within a single database transaction (Step 602). A determination is made as to whether any step has failed (Step 604). If a step has failed, all events picked up within the single database transaction are reset to their original state so that they may be picked up again by any node at the next interval (Step 606). The reset events are picked up by any currently available node (Step 608). If no steps failed at Step 604, the process progresses to Step 610. A determination is made whether another iteration is necessary to process groups of the remaining events picked up on this node (Step 610). If there is another iteration, process 600 goes to Step 602. If not, process 600 ends.

Figure 7:
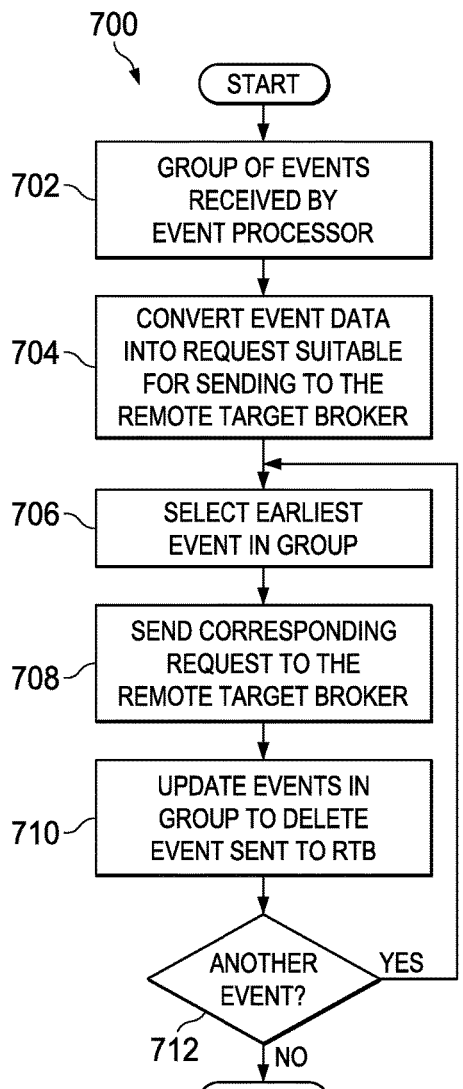
FIG. 7 is a flowchart illustrating a processing sequence of an event in accordance with an illustrative embodiment.

FIG. 7 depicts a flowchart illustrating a processing sequence of an event processor in accordance with an illustrative embodiment. In an illustrative embodiment, an event processor, such as event processor 316 or event processor 322 in FIG. 3, may be a multi-threaded event processor responsible for processing the events delivered to it from the event monitor by sending requests to the remote target.

Figure 8:
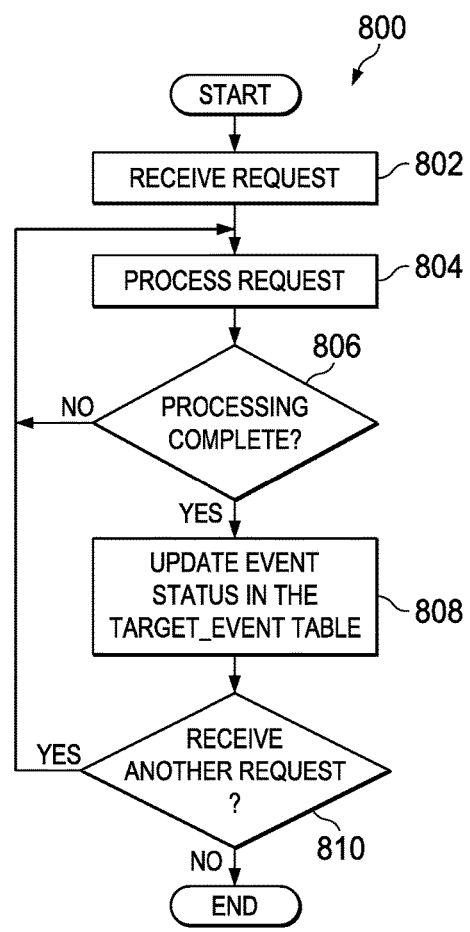
FIG. 8 is a flowchart illustrating a remote target processor in accordance with an illustrative embodiment.

Processing sequence 700 receives a group of events delivered to the event processor (Step 702). The event processor converts the event data into requests suitable for sending to the remote target request broker (Step 704). For example, in the case of an account create event, account templates may be queried and any applicable or required attributes are appended to the request. The event processor iterates over each event in sequence, starting with the earliest one in the group, and sends a corresponding request to the remote target request broker. Thus, process 700 selects an earliest event in a group (Step 706). A corresponding request is sent to the remote target broker (Step 708). The remote target request broker process is depicted in FIG. 8. Event status is updated appropriately in the TARGET_EVENT table depending on the outcome of the remote processing by the remote target broker (RTB) (Step 710). A determination is made as to whether there is another request (Step 712). If there is another request, process 700 returns to Step 706. If not, process 700 ends.

FIG. 8 depicts a flowchart illustrating a process for a remote target processor to process a request in accordance with an illustrative embodiment. A remote target broker receives a request (Step 802). The request is processed (Step 804). A determination is made as to whether processing is complete (Step 806). If processing is complete, the event status in the TARGET_EVENT table is updated (Step 808). If processing is not complete, the process returns to Step 804. A determination is made as to whether there is another request (Step 810). If there is another request process 800 goes to step 804. If not, process 800 ends.

Figure 9:
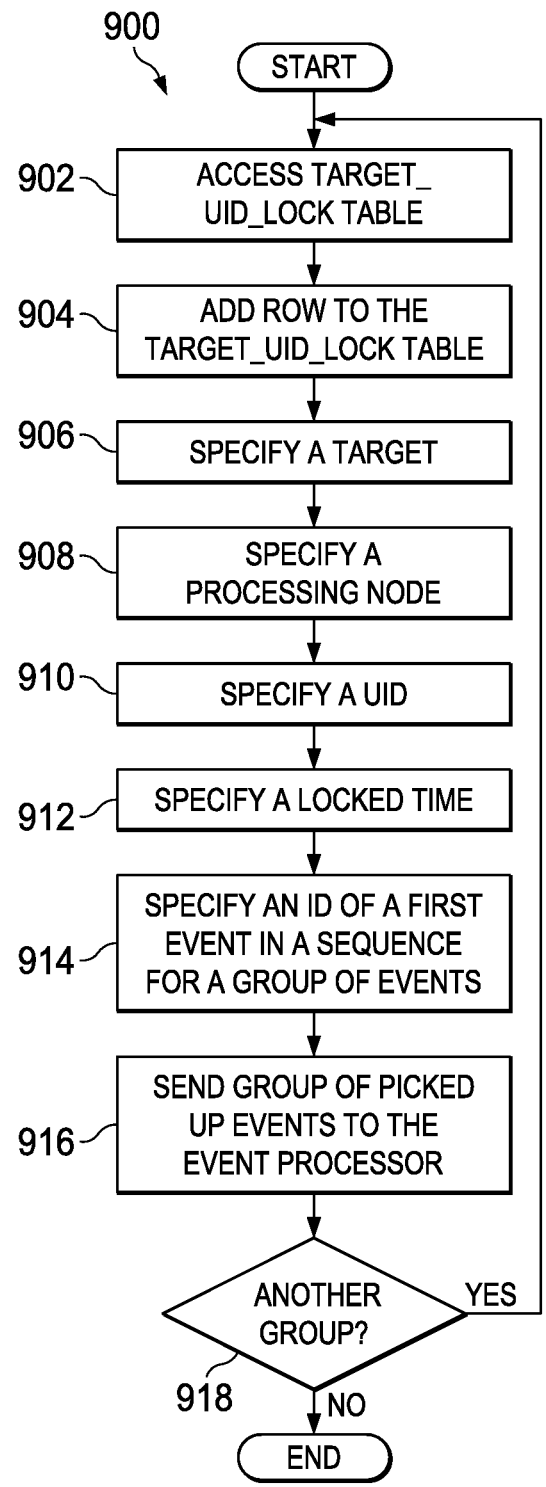
FIG. 9 is a flowchart illustrating a process for a remote target processor to process a request in accordance with an illustrative embodiment.

FIG. 9 depicts a flowchart illustrating a process for event locking in accordance with an illustrative embodiment. In an illustrative embodiment, event locking may be done at the unique target-UID level. New TARGET_UID_LOCK table may be TARGET_UID_LOCK tables 245, 304, and 410 shown in FIGS. 2, 3 and 4, respectively. Before sending the group of picked up events to the event processor, event monitor will access TARGET_UID_LOCK table (Step 902). Next, a row is added to the TARGET_UID_LOCK table (Step 904). A target is specified (Step 906). A processing node is specified (Step 908). A user identification (UID) is specified (Step 910). A locked time is specified (Step 912). The ID of the first event in sequence for the group of events is specified (Step 914). This will effectively lock the UID on a specific target for the duration of time required to process the event group on one node of the cluster. The group of picked up events is sent to the event processor (Step 916). A determination is made whether there is another group (Step 918). If there is another group, process 900 returns to Step 902. If not, process 900 ends.

Figure 10:
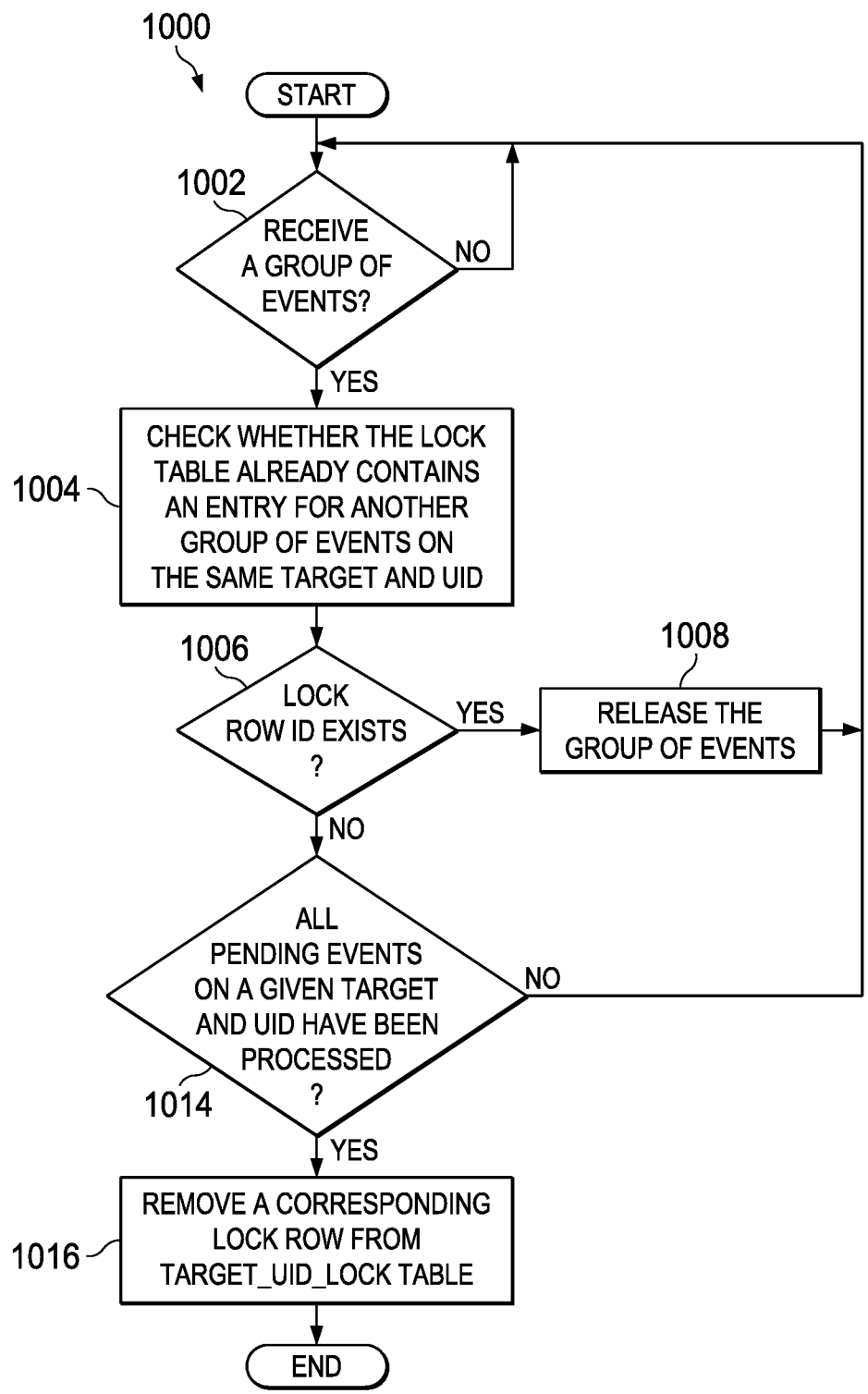
FIG. 10 is a flowchart illustrating a process for an event retry sequence in accordance with an illustrative embodiment.

FIG. 10 depicts a flowchart illustrating an event retry sequence in accordance with an illustrative embodiment. An event processor may detect a server failure with a status interpreted as a temporary failure. Process 1000 determines whether a group of events has been received (Step 1002). If not, the process begins again. If at Step 1002, a group of events is received, process 1000 checks whether the lock table already contains an entry for another group of events on the same target and UID (Step 1004). A determination is made as to whether a lock row ID exists (Step 1006). If a lock row ID exists, the event processor will release the received events so that they may be picked up again at the next pickup interval possibly by another node (Step 1008). This step repeats until the event monitor on one of the nodes picks up a group of events for a UID and that the UID is not locked. Thus, when a determination is made at step 1006 that no lock row ID exists, the process makes a determination as to whether all pending events on a given target and UID have been processed (Step 1014). If all pending events have not been processed, the process returns to Step 1002. When an event processor on any node detects that all pending events on the given target and UID have been processed, process 1000 removes the corresponding lock row from TARGET_UID_LOCK table (Step 1016). Process 1000 ends.

Figure 11:
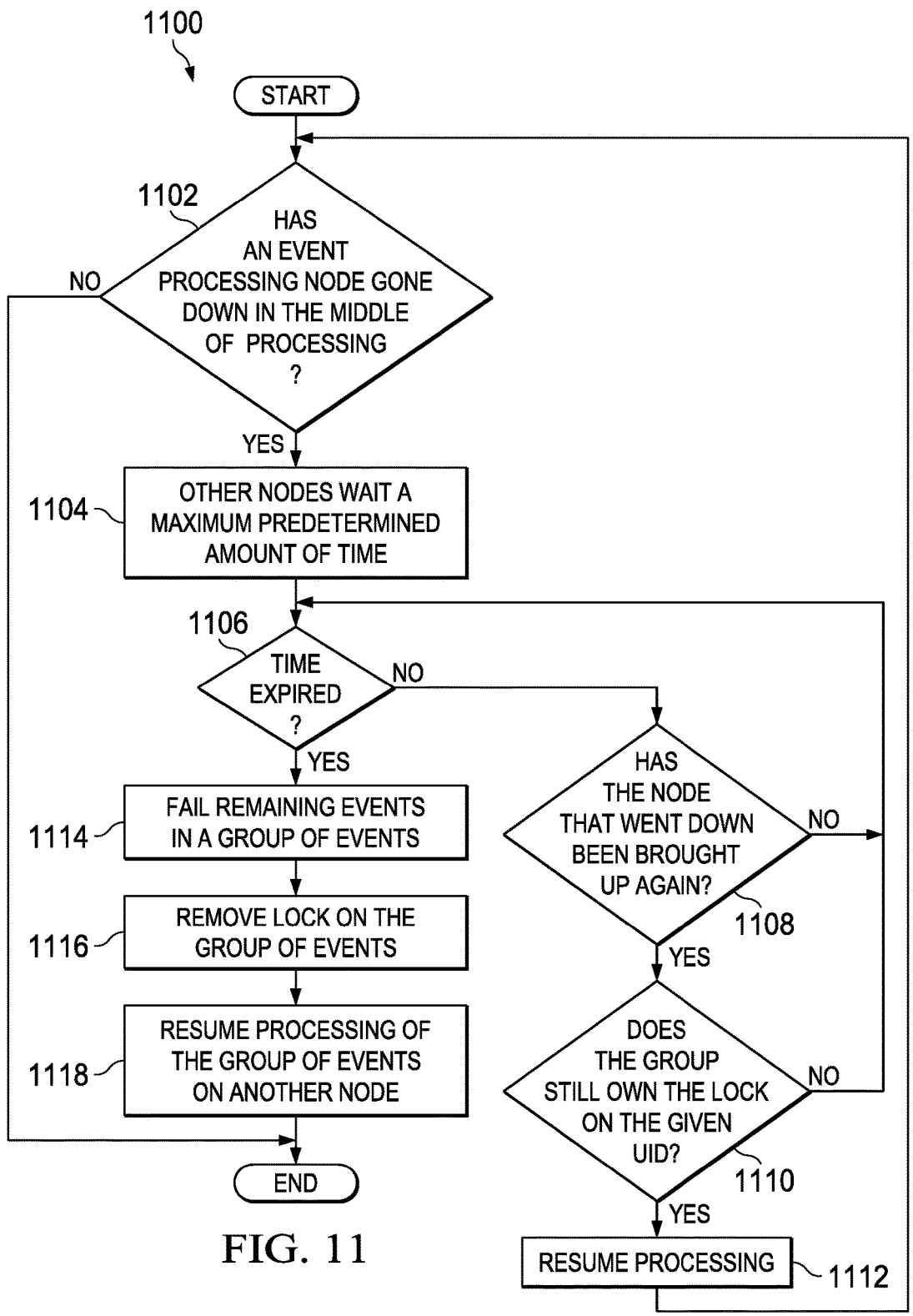
FIG. 11 is a flowchart illustrating a process for dealing with an event processing node that goes down in accordance with an illustrative embodiment.

FIG. 11 depicts a flowchart illustrating a process for dealing with an event processing node that goes down in accordance with an illustrative embodiment. A determination is made as to whether an event processing node has gone down in the middle of processing (Step 1102). If not, the process terminates. If the event processing node goes down in the middle of processing, other nodes will wait a maximum predetermined amount of time (Step 1104). The maximum predetermined amount of time may be maxRetryDuration and is the time before one of the processing nodes will fail the remaining events in the group and remove the lock. In this way, the processing of new events on that UID may resume on another node. A determination is made as to whether the time has expired (Step 1106). If the time has not expired, a determination is made whether the node which went down is brought up again within the maxRetryDuration (Step 1108). If the node has not been brought back up, the process returns to Step 1106. If the node has been brought back up, a determination is made if the group still owns the lock given on the UID (Step 1110). If the group still owns the lock on the UID, processing resumes (Step 1112) and the process returns to Step 1102. If not, the process goes to Step 1106. Returning now to Step 1106, if the time has expired, process 1100 fails the remaining events in a group of events (Step 1114). The lock on the group of events is removed (Step 1116). Processing of the group of events on another node is resumed (Step 1118). Process 1100 ends.

Every time an event is successfully processed, the LAST_EVENT_ID is updated in the TARGET_UID_LOCK table. This way, if any other node needs to pick up the processing, it will have way to check if it needs to wait for an earlier sequence of events to be processed first.

Figure 12:
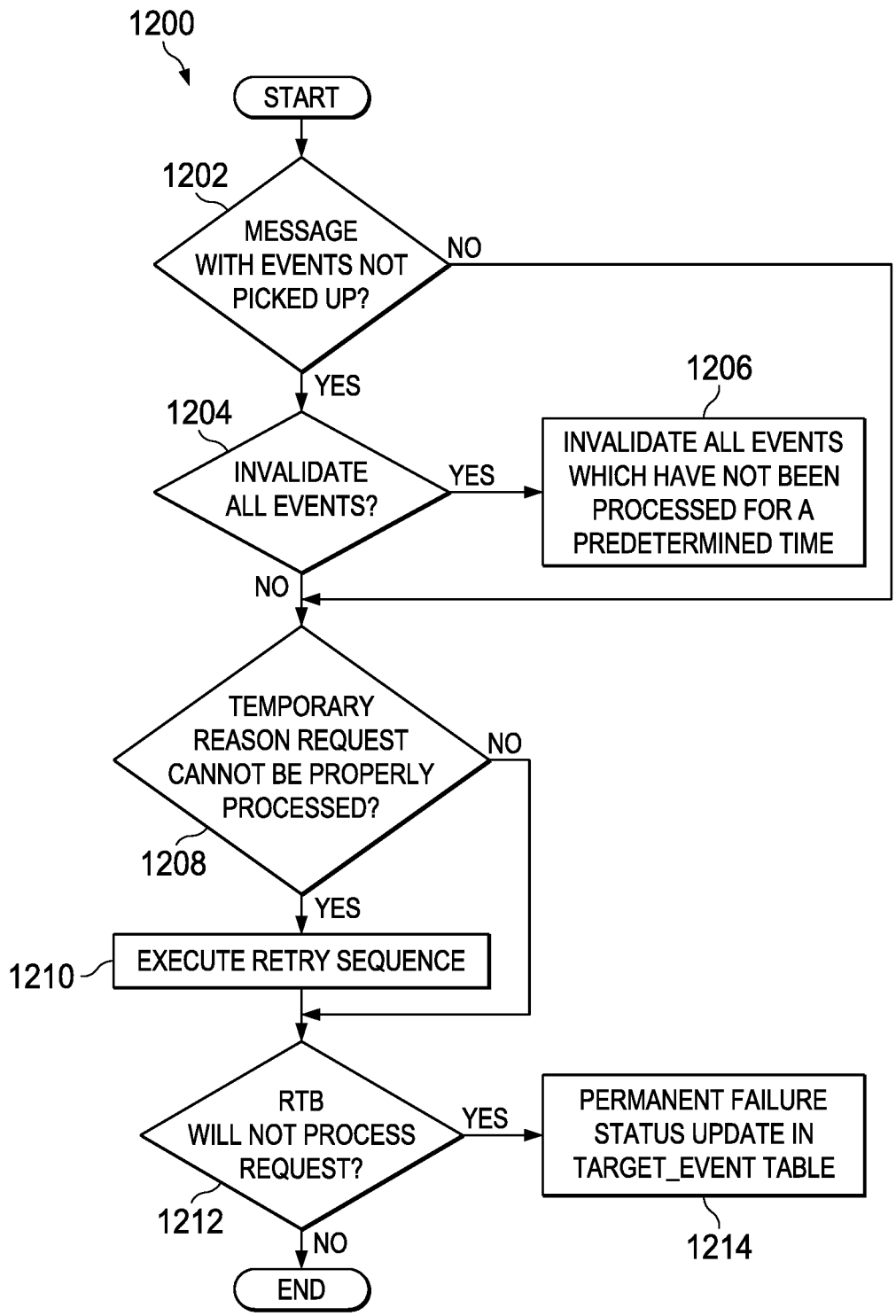
FIG. 12 is a flowchart illustrating a retry process in accordance with an illustrative embodiment.

FIG. 12 depicts a flowchart illustrating a retry process in accordance with an illustrative embodiment. There are three basic types of errors that may occur when processing access request events once the event has been successfully delivered to the event processor. First, a message with events may not be picked up, because the messaging component or a server instance has gone down for maintenance, for example. Second, if a remote target broker is down or a remote target is down or for any other temporary reason, the request cannot be processed remotely. Third, the remote target broker cannot and will not process the request, for example, a bad request or target has been taken down (deleted) permanently. The first error may result in an unprocessed event holding up other subsequent events affecting the same account UID. The system may decide to invalidate all events, which have not been processed for a predetermined duration of time. The second error should always result in retried event processing up to maxRetryDuration. The third error should result in permanent failure, which should be reflected in the event status being updated accordingly in the TARGET_EVENT table. This condition may also result in failing of subsequent dependent events on another node, which now have no chance of succeeding.

Thus, process 1200 determines whether a message with events has not been picked up (Step 1202). If this is true, a determination is made whether all events should be invalidated (Step 1204). If all events should be invalidated, all events which have not been processed for a predetermined time are invalidated (Step 1206). If all events are not to be invalidated, or if at Step 1202 a message with events was picked up, process 1200 goes to Step 1208. A determination is made whether the reason a request cannot be processed is temporary (Step 1208). If the reason is temporary, a retry sequence is executed (Step 1210) and the process goes to step 1212. If the reason is not temporary, the process proceeds to Step 1212. A determination is made whether a remote target broker will not process the request (Step 1212). If a remote target broker will not process the request, a permanent failure is made a status update in TARGET_EVENT table (Step 1214). If not, the process terminates.

Figure 13:
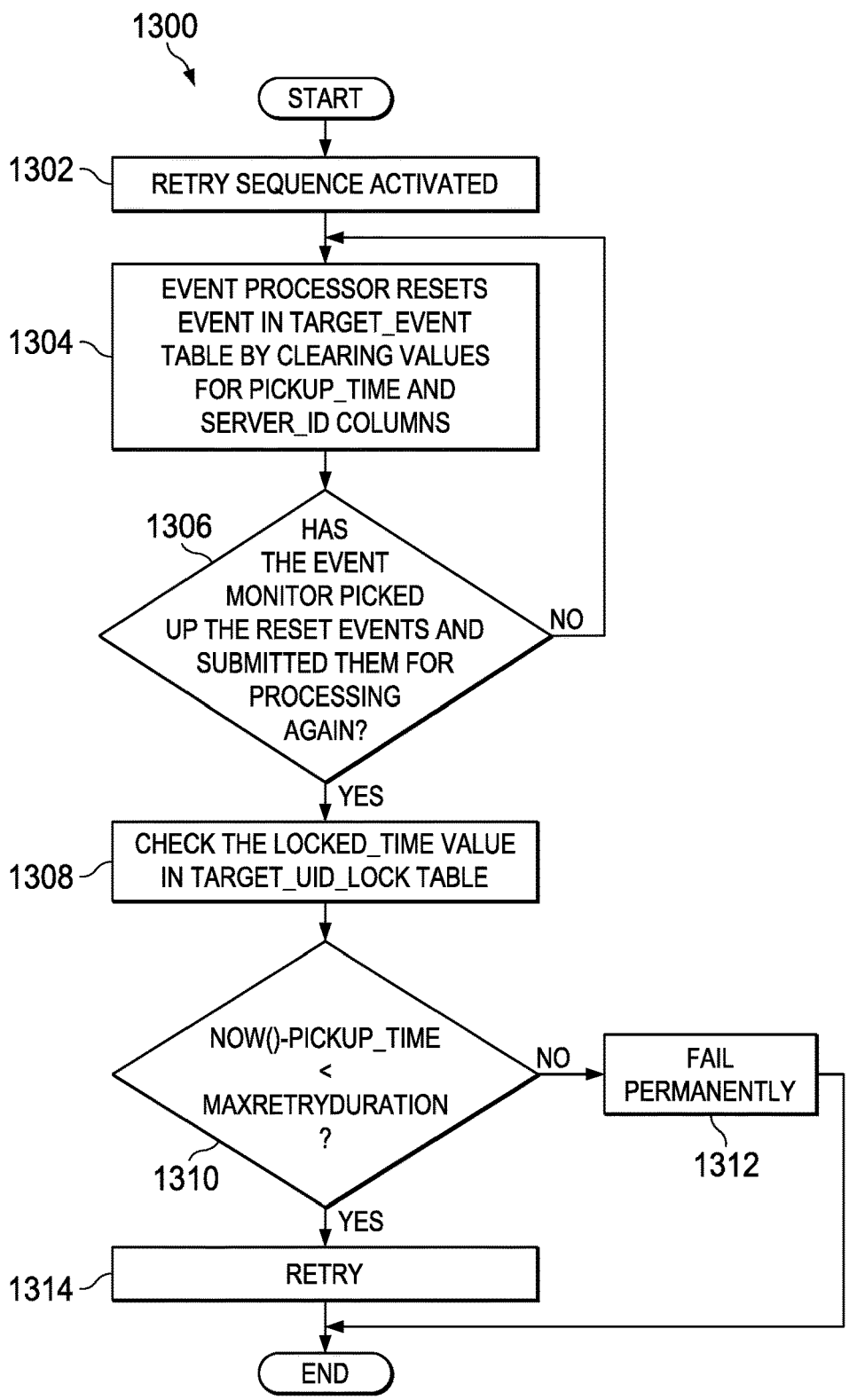
FIG. 13 is a flowchart illustrating an event-retry process in accordance with an illustrative embodiment.

FIG. 13 depicts a flowchart illustrating an event retry process in accordance with an illustrative embodiment. An event retry sequence such as process 1300 is activated (Step 1302) when an event processor detects an interactive broker (TB) server failure with a status interpreted as a temporary failure. Event processor resets the events in TARGET_EVENT table by clearing values for PICKUP_TIME and SERVER_ID columns (Step 1304). A determination is made whether the event monitor has picked up the reset events and submitted them for processing again (Step 1306). If not, the process goes to Step 1304. If the event monitor has picked up the reset events and submitted them for processing again, the event processor checks the LOCKED_TIME value in TARGET_UID_LOCK table (Step 1308). Based on a predetermined maxRetryDuration value, a determination is made whether a maximum time has been met or exceeded (Step 1310). If at Step 1310 NOW( )-PICKUP_TIME is less than maxRetryDuration, the reset events are retried (step 1314). If at Step 1310 NOW( )-PICKUP_TIME is greater than maxRetryDuration, then the process fails permanently (step 1312). The default constant idleTime interval value is configurable with default set to 60 seconds.

Therefore, using the above technique, if the value of maxRetryDuration is 10 minutes, the event could potentially be reset up to 9 times:

$$(\text{maxRetryDuration} * 60 / \text{idleTime}) - 1.$$

The retry technique may utilize a constant or a gradually increasing time delay, which is configurable. The constant delay may be equal to the idleTime value as shown above.

To avoid too frequent or too seldom retries, the configurable values of idleTime and maxRetryDuration may be adjusted. Arbitrarily, a custom retryDelay interval could be introduced after each non-permanent failure and before the event is reset and retried. In such case, the event would be scheduled for reset after an ever increasing the time interval initially equal to retryDelay parameter. During each subsequent retry attempt, a fixed amount of time equal to retryDelay value is added to the previously used delay value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, a segment, or a portion of code, which comprises one or more executable instructions for implementing the specified logical function or functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. A computer implemented cluster aware target user identification (target-UID) locking method comprising:
    obtaining, by the processor, information from a target UID lock table, wherein the target UID lock table includes a lock row including a target, a cluster processing node associated with the target, a user identification (UID) associated with the target, a lock time associated with the UID, and an identification of a beginning event in an event group of events from a target event table;
    reserving the events in the event group for processing by the cluster processing node which triggers a query;

inserting, by the processor, pickup time values and server ID values for each of the events, wherein the pickup time values contain timestamps when a given event was picked up by the processor, and the server ID values identify a given cluster processing node of a cluster which picked up the event;

grouping, by the processor, the events by the target and the UID while preserving a relative order in an overall event sequence;

submitting, by the processor, the event group to the cluster for processing by particular cluster processing nodes of the cluster in accordance with the server ID values for each of the events;

locking the UID on the target for the lock time; and processing the beginning event during the lock time, wherein the processing of the beginning event is performed by the cluster processing node.

2. The computer implemented method of claim 1, further comprising:

obtaining additional information from the target UID lock table, wherein the additional information includes another lock row including the target, another UID, and another beginning event for another event group.

3. The computer implemented method of claim 2, further comprising:

locking the another UID.

4. The computer implemented method of claim 3, further comprising:

processing the another beginning event, wherein the processing of the another beginning event is performed by another cluster processing node of the cluster; and processing additional events from the event group during the lock time, wherein the processing of the additional events is performed by the cluster processing node.

5. The computer implemented method of claim 4, further comprising:

responsive to the processing node going down while processing one of the events in the event group, failing any remaining events in the event group.

6. The computer implemented method of claim 4, further comprising:

responsive to one of the events in the event group successfully processing, updating a LAST_EVENT-ID in the table.

7. The computer implemented of claim 4, further comprising;

responsive to all of the events in the group of events being processed, removing the lock row from the table, such that the processing node is available to process other events.

8. A computer system comprising:

a processor connected to a database, an application server cluster, a remote account request target broker, and a number of remote targets, the database and the application server cluster storing instructions configured to cause the processor to perform steps comprising:

obtaining, by the processor, information from a target UID lock table, wherein the target UID lock table includes a lock row including a target, a cluster processing node associated with the target, a userid (UID) associated with the target, a lock time associated with the UID, and an identification of a beginning event in an event group of events from a target event table;

reserving the events in the event group for processing by the cluster processing node which triggered a query;

inserting, by the processor, pickup time values and server ID values for each of the events, wherein the pickup time values contain timestamps when a given event was picked up by the processor, and the server ID values identify a given cluster processing node of a cluster which picked up the event;

grouping, by the processor, the events by the target and the UID while preserving a relative order in an overall event sequence;

submitting, by the processor, the event group to the cluster for processing by particular cluster processing nodes of the cluster in accordance with the server ID values for each of the events;

locking the UID on the target for the lock time;

processing the beginning event during the lock time, wherein the processing of the beginning event is performed by the cluster processing node.

9. The computer system of claim 8, wherein the database and the application server cluster store further instructions configured to cause the process to perform steps comprising:

obtaining additional information from the target UID lock table, wherein the additional information includes another lock row including the target, another UID, and another beginning event for another event group.

10. The computer system of claim 9, wherein the database and the application server cluster store further instructions configured to cause the process to perform steps comprising:

locking the another UID.

11. The computer system of claim 10, wherein the database and the application server cluster store further instructions configured to cause the process to perform steps comprising:

processing the another beginning event, wherein the processing of the another beginning event is performed by another cluster processing node of the cluster; and processing additional events from the event group during the lock time, wherein the processing of the additional events is performed by the cluster processing node.

12. The computer system of claim 11, wherein the database and the application server cluster store further instructions configured to cause the process to perform steps comprising:

responsive to the processing node going down while processing one of the events in the event group, failing any remaining events in the event group.

13. The computer system of claim 11, wherein the database and the application server cluster store further instructions configured to cause the process to perform steps comprising:

responsive to one of the events in the event group successfully processing, updating a LAST_EVENT-ID in the table.

14. A computer program product for dynamically injecting a wait function into a program, the computer program product comprising a computer-readable storage medium having program instructions executable by a computer to cause the computer to perform a method comprising:

obtaining, by the processor, information from a target UID lock table, wherein the target UID lock table includes a lock row including a target, a cluster processing node associated with the target, a user identification (UID) associated with the target, a lock time associated with the UID, and an identification of a beginning event in an event group of events from a target event table;

reserving the events in the event group for processing by the cluster processing node which triggered a query;

inserting, by the processor, pickup time values and server ID values for each of the events in the event group, wherein the pickup time values contain timestamps when a given event was picked up by the processor, and the server ID values identify a given cluster processing node of a cluster which picked up the event;

grouping, by the processor, the events by the target and the UID while preserving a relative order in an overall event sequence;

submitting, by the processor, the event group to the cluster for processing by particular cluster processing nodes of the cluster in accordance with the server ID values for each of the events;

locking the UID on the target for the lock time;

processing the beginning event during the lock time, wherein the processing of the beginning event is performed by the cluster processing node.

15. The computer program product of claim 14, wherein the program instructions further comprise:

obtaining additional information from the target UID lock table, wherein the additional information includes another lock row including the target, another UID, and another beginning event for another event group.

16. The computer program product of claim 15, wherein the program instructions further comprise:

locking the another UID.

17. The computer program product of claim 16, wherein the program instructions further comprise:

processing the another beginning event, wherein the processing of the another beginning event is performed by another cluster processing node of the cluster; and processing additional events from the event group during the lock time, wherein the processing of the additional events is performed by the cluster processing node.

18. The computer program product of claim 16, wherein the program instructions further comprise:

responsive to the processing node going down while processing one of the events in the event group, failing any remaining events in the event group.

19. The computer program product of claim 16, wherein the program instructions further comprise:

responsive to all of the events in the group of events being processed, removing the lock row from the table such that the processing node is available to process other events.

20. The computer program product of claim 16, wherein the program instructions further comprise:

responsive to one of the events in the event group successfully processing, updating a LAST_EVENT-ID in the table.

\* \* \* \* \*